United States Patent
Senzaki (10) Patent No.: US 11,436,705 B2
(45) Date of Patent: Sep. 6, 2022

(54) RADAR IMAGE PROCESSING DEVICE, RADAR IMAGE PROCESSING METHOD, AND RADAR IMAGE PROCESSING PROGRAM

(71) Applicant: NEC Corporation, Tokyo (JP)

(72) Inventor: Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 219 days.

(21) Appl. No.: 16/652,727

(22) PCT Filed: Sep. 27, 2018

(86) PCT No.: PCT/JP2018/035929
§ 371 (c)(1),
(2) Date: Apr. 1, 2020

(87) PCT Pub. No.: WO2019/069787
PCT Pub. Date: Apr. 11, 2019

(65) Prior Publication Data
US 2020/0242738 A1  Jul. 30, 2020

(30) Foreign Application Priority Data

Oct. 2, 2017 (JP) .............................. JP2017-192496

(51) Int. Cl.
*G06T 5/00* (2006.01)
*G01S 13/89* (2006.01)
(52) U.S. Cl.
CPC ............ *G06T 5/002* (2013.01); *G01S 13/895* (2019.05); *G06T 2207/10044* (2013.01); *G06T 2207/20182* (2013.01)
(58) Field of Classification Search
CPC .. G06T 5/002; G06T 5/20; G06T 5/50; G06T 1/00; G06T 7/00; G06T 7/11; G06T 7/70;
(Continued)

(56) References Cited

U.S. PATENT DOCUMENTS 4,924,229 A * 5/1990 Eichel ................. G01S 13/9019
342/25 E
5,191,344 A * 3/1993 Moreira .............. G01S 13/9011
342/25 A
(Continued)

FOREIGN PATENT DOCUMENTS

CN  106646398 A * 5/2017 ............... G01S 7/38
JP  2001-242244 A  9/2001
(Continued)

OTHER PUBLICATIONS

International Search Report for PCT Application No. PCT/JP2018/035929, dated Nov. 20, 2018.
(Continued)

*Primary Examiner* — Jose L Couso
(74) *Attorney, Agent, or Firm* — Sughrue Mion, PLLC (57) ABSTRACT

A radar image processing device includes: an estimation unit 1 for setting, as a target pixel, each pixel of a two-dimensional map image, and estimating to which type each target pixel belongs among a pixel caused by the main lobe, a pixel due to the sidelobe, and any other pixel; a pixel value replacement unit 2 for replacing the pixel value of the pixel caused by the main lobe and the pixel value of the pixel due to the sidelobe with pixel values generated in pixel value interpolation processing based on the type of each pixel estimated by the estimation unit 1 to generate a first corrected image; a speckle noise suppression unit 3 for applying speckle noise suppression processing to the first corrected image to generate a second corrected image; and an output image generation unit 4 for generating an output image, in which speckle noise and sidelobes are suppressed, by using the two-dimensional map image, the second corrected image, and the type of each pixel.

20 Claims, 8 Drawing Sheets

(58) Field of Classification Search
CPC .......... G06T 7/90; G06T 7/33; G06T 3/4038;
G06T 2207/10044; G06T 2207/20182;
G06T 2207/20076; G06T 2207/20081;
G06T 2207/20084; G06T 15/00; G06T
15/205; G06T 17/00; G06T 17/05; G01S
13/895; G01S 13/9027; G01S 13/90;
G01S 13/9023; G01S 13/06; G01S
13/9005; G01S 13/9056; G01S 13/9021;
G01S 13/9011; G01S 13/9004; G01S
13/9017; G01S 13/9019; G01S 13/904;
G01S 7/2955; G01S 7/295; G01S 7/411;
G06K 9/00; G06K 9/00523; G06K
9/0055; G06K 9/00697; G06K 9/46;
G06K 9/4604; G06K 9/4609; G06K
9/4642; G06K 9/6202; G06K 9/6212;
G06K 9/6215; G06K 9/627; G06K
9/6276; G06K 9/0063; G06K 9/3233;
G06K 9/527; G06K 9/6219; G06K
9/6298; G06K 9/6256; G06K 2009/6213;
G01C 11/00; G06V 10/759; G06V 10/72;
G06V 10/7625; G06V 10/751; G06V
10/758; G06V 10/761; G06V 10/40;
G06V 10/44; G06V 10/50; G06V 10/25;
G06V 10/52; G06V 10/774; G06V 20/38;
G06V 20/13; G06V 30/19107; G06V
30/19093
See application file for complete search history.

(56) References Cited

U.S. PATENT DOCUMENTS

| | | | |
|---|---|---|---|
| 5,424,743 A | 6/1995 | Ghiglia et al. | |
| 5,812,082 A * | 9/1998 | Moreira | G01S 13/9056 |
| | | | 342/25 A |
| 6,441,772 B1 * | 8/2002 | Hellsten | G01S 13/9017 |
| | | | 342/25 R |
| 8,125,370 B1 * | 2/2012 | Rogers | G01S 13/904 |
| | | | 342/25 F |
| 2018/0267163 A1 * | 9/2018 | Hellsten | G06K 9/0063 |

FOREIGN PATENT DOCUMENTS

| | | |
|---|---|---|
| JP | 2003-043135 A | 2/2003 |
| JP | 2004-309158 A | 11/2004 |
| JP | 2006-029979 A | 2/2006 |

OTHER PUBLICATIONS

H. C. Stankwitz, R. J. Dallaire, and J. R. Fienup, "Nonlinear Apodization for Sidelobe Control in SAR Imagery," IEEE Transactions on Aerospace and Electronic Systems, vol. 31, No. 1, pp. 267-279, Jan. 1995, USA.

S. Parrilli, M. Poderico, C. V. Angelino and L. Verdoliva, "A Nonlocal SAR Image Denoising Algorithm Based on LLMMSE Wavelet Shrinkage," IEEE Transactions on Geoscience and Remote Sensing, vol. 50, No. 2, pp. 606-616, Feb. 2012, USA.

T. Xiong, S. Wang, B. Hou, Y. Wang and H. Liu, "A Resample-Based SVA Algorithm for Sidelobe Reduction of SAR/ISAR Imagery With Noninteger Nyquist Sampling Rate," IEEE Transactions on Geoscience and Remote Sensing, vol. 53, No. 2, pp. 1016-1028, Feb. 2015, USA.

* cited by examiner

RADAR IMAGE PROCESSING DEVICE, RADAR IMAGE PROCESSING METHOD, AND RADAR IMAGE PROCESSING PROGRAM

This application is a National Stage Entry of PCT/JP2018/035929 filed on Sep. 27, 2018, which claims priority from Japanese Patent Application 2017-192496 filed on Oct. 2, 2017, the contents of all of which are incorporated herein by reference, in their entirety.

TECHNICAL FIELD

The present invention relates to a radar image processing device, a radar image processing method, and a radar image processing program for processing image data acquired by a radar.

BACKGROUND ART

There is a synthetic aperture radar (SAR) as a device for observing an area to be observed from the sky and making an analysis for the purpose of observing a state of the ground surface or the like.

An antenna in the SAR radiates electromagnetic waves from the sky onto the ground surface. The SAR acquires the reflected wave intensity of the electromagnetic waves. Then, the SAR uses the reflected wave intensity to observe the state of the ground surface.

Based on the distance between the antenna in the sky and an object on which the electromagnetic waves are reflected, the SAR creates a two-dimensional map image of the reflected wave intensity (hereinafter called a "SAR image"). In the SAR, pulse compression technology is used to increase the resolution of the SAR image.

The pulse compression technology is technology using, as transmission waves, electromagnetic waves whose frequency is linearly modulated (chirp-modulated) with respect to time. Reflected waves of the electromagnetic waves from the ground are subjected to correlation processing with a reference signal. As a result, since signal energy is concentrated in a narrow time width, a high-resolution image can be obtained.

Enhancing the resolution in the irradiation direction (range direction) of electromagnetic waves can be realized by the modulation of a transmission pulse in the pulse compression technology. Enhancing the resolution in the wave traveling direction (azimuth direction) of the antenna is realized by using a phase change, i.e., the doppler effect, of a received signal dependent on the distance between a ground-surface object and the antenna.

The reflected waves have a sinc-function shape by pulse compression. As a result, low peaks (sidelobes) occur in positions close to an original ground-surface object other than a high peak (a main lobe) generated in the position of the original ground-surface object. The peak height of each sidelobe is proportional to the peak height of the main lobe. Then, the peak of a sidelobe derived from the main lobe of a ground-surface object that exhibits strong reflection and scattering may exceed the peak of the main lobe of another ground-surface object located therearound and exhibiting weak reflection and scattering. In such a case, the observation of the ground-surface object that exhibits weak reflection and scattering is hindered.

Since the sidelobes reduce the recognition and detection accuracies of a ground-surface object, it is preferred to suppress sidelobes in object recognition and object detection using a SAR image.

As a method of suppressing sidelobes, a method of applying a window function upon pulse compression is generally used. However, when the window function is applied, since the width of the main lobe is widened while the sidelobes are suppressed, there is a problem that the image resolution is reduced.

Non-Patent Literature 1 describes a technique for performing a predetermined operation on a Single Look Complex (SLC) as SAR data after being subjected to pulse compression without using the window function. Specifically, based on the correlation between pixel values of a target pixel and each of pixels therearound in SLC data, it is determined whether the target pixel is a pixel caused by the main lobe, a pixel due to the sidelobe, or any other pixel. In other words, the pixel type is determined. Then, when the pixel caused by the main lobe is determined, the pixel value is maintained. When the pixel due to the sidelobe is determined, the pixel value is set to 0. When any other pixel is determined, a low-pass filter using surrounding pixels is applied to the pixel concerned. Such an operation suppresses the sidelobes while preventing the resolution of the main lobe from being lowered.

Further, the SAR image includes multiplicative noise called a speckle (a speckle noise) as such a factor other than sidelobes as to hinder the recognition and detection of a ground-surface object. The speckle degrades an image and makes it difficult to analyze the image.

Many speckle suppression techniques to which a noise suppression technique in image processing is applied are proposed.

For example, Non-Patent Literature 2 proposes SAR-BM3D (Block Matching and 3D Collaborative Filtering) as a scheme in which BM3D considered effective for noise suppression in general image processing is extended to a multiplicative noise model. In Non-Patent Literature 2, it is indicated that speckle can be effectively suppressed by using the redundancy of an input image and the correlation between pixel values.

CITATION LIST

Non Patent Literature

Non-Patent Literature 1: H. C. Stankwitz, R. J. Dallaire, and J. R. Fienup, "Nonlinear Apodization for Sidelobe Control in SAR Imagery," IEEE Transactions on Aerospace and Electronic Systems, vol. 31, no. 1, pp. 267-279, January 1995

Non-Patent Literature 2: S. Parrilli, M. Poderico, C. V. Angelino and L. Verdoliva, "A Nonlocal SAR Image Denoising Algorithm Based on LLMMSE Wavelet Shrinkage," IEEE Transactions on Geoscience and Remote Sensing, vol. 50, no. 2, pp. 606-616, February 2012

Non-Patent Literature 3: T. Xiong, S. Wang, B. Hou, Y. Wang and H. Liu, "A Resample-Based SVA Algorithm for Sidelobe Reduction of SAR/ISAR Imagery With Noninteger Nyquist Sampling Rate," IEEE Transactions on Geoscience and Remote Sensing, vol. 53, no. 2, pp. 1016-1028, February 2015

SUMMARY OF INVENTION

Technical Problem

Although a sidelobe suppression technique is disclosed in Non-Patent Literature 1 or the like and a speckle suppression technique is disclosed in Non-Patent Literature 2 or the like, it is not assumed that both techniques cooperate with each other. Under the current circumstances, processing for sidelobe suppression and processing for speckle suppression have to be executed serially on an input SAR image in order to suppress noise factors as sidelobes and a speckle different in nature from each other.

However, when the processing for sidelobe suppression and the processing for speckle suppression are executed serially, the following problems arise.

When the processing for speckle suppression is executed after the processing for sidelobe suppression is executed, there is a possibility that the performance of speckle suppression will be degraded. On the other hand, when the processing for sidelobe suppression is executed after the processing for speckle suppression is executed, there is also a possibility that the performance of speckle suppression will be degraded.

Figure 8:
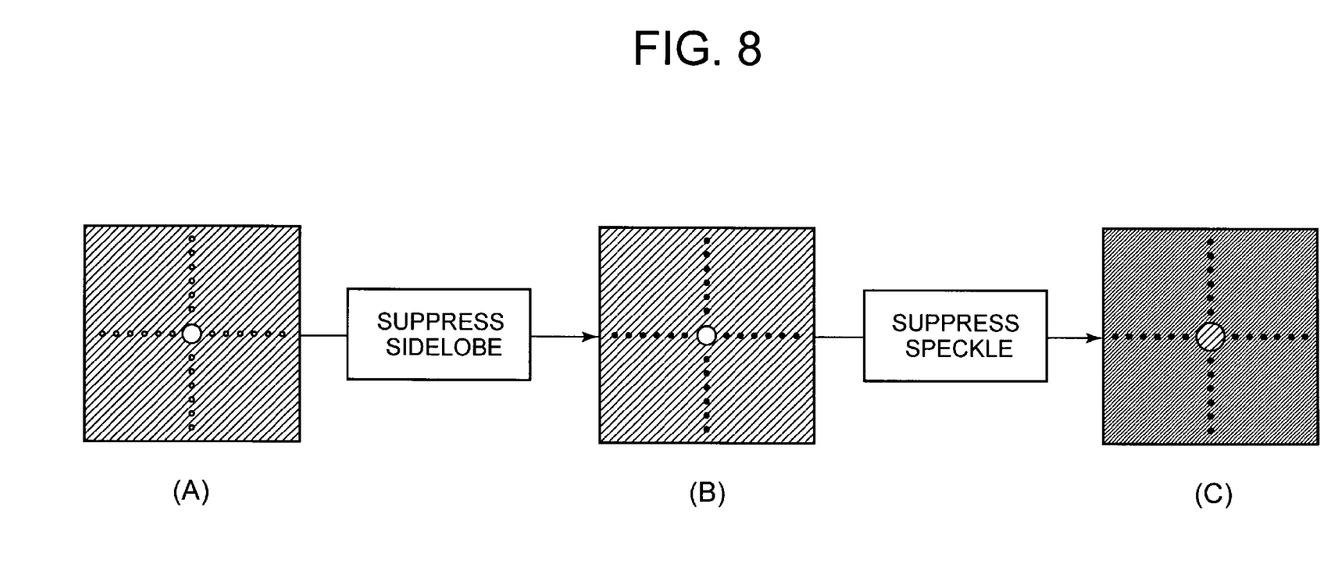
FIG. 8 is an explanatory diagram for describing a problem that occurs when processing for sidelobe suppression is executed first.

FIG. 8 is an explanatory diagram for describing a problem that occurs when the processing for sidelobe suppression is executed first. Suppose that the processing for sidelobe suppression is executed on a SAR image illustrated at (A). In this case, when a target pixel is determined to be a pixel due to the sidelobe (see each of small white dots at (A)), the pixel value is set to 0 (see each of small black dots at (B)). Therefore, even when any component other than a sidelobe component is present in the pixel, the component is removed.

Further, in such an image (image illustrated at (B)), a main lobe component having a low correlation with surrounding pixels remain. Then, when the processing for speckle suppression is executed on such an image, the effect of speckle suppression is reduced to cause an image blur or a drop in peak of the main lobe (see (C) in FIG. 8).

Figure 9:
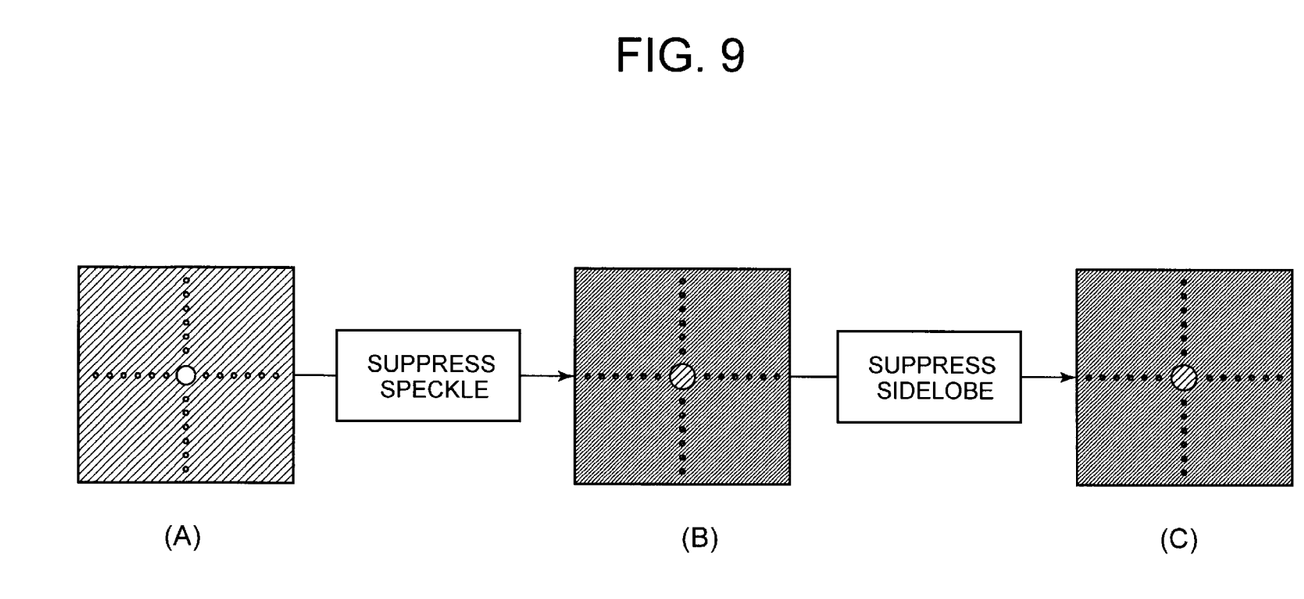
FIG. 9 is an explanatory diagram for describing a problem that occurs when processing for speckle suppression is executed first.

FIG. 9 is an explanatory diagram for describing a problem that occurs when the processing for speckle suppression is executed first. In an input SAR image (SAR image illustrated at (A)), a pixel of a main lobe component having a low correlation with surrounding pixels or a pixel due to the sidelobe may exists. When the processing for speckle suppression is executed on such an image, the effect of speckle suppression is reduced to cause an image blur or a drop in peak of the main lobe (see (B) in FIG. 9).

Further, when the processing for sidelobe suppression is executed on such an image (image illustrated at (B)) (see (C) in FIG. 9), the accuracy of the determination as to whether it is a sidelobe or a main lobe is reduced due to the influence of blur. As a result, sidelobes cannot be suppressed effectively.

It is an object of the present invention to provide a radar image processing device, a radar image processing method, and a radar image processing program for enhancing the effects of suppressing sidelobes and a speckle included in a two-dimensional map image of a reflected wave intensity.

Solution to Problem

A radar image processing device according to the present invention includes: estimation means for estimating a type of a pixel as a target pixel, among a type of a pixel caused by a main lobe, a type of a pixel due to a sidelobe, and a type of any other pixel, at each pixel position of a two-dimensional map of an observed reflected wave intensity; pixel value replacement means for replacing a pixel value of the pixel caused by the main lobe and a pixel value of the pixel due to the sidelobe with pixel values generated in pixel value interpolation processing based on the type of each pixel estimated by the estimation means to generate a first corrected image; speckle suppression means for applying speckle suppression processing to the first corrected image to generate a second corrected image; and output image generation means for generating an output image, in which speckle and sidelobes are suppressed, by using the two-dimensional map image, the second corrected image, and the type of each pixel.

A radar image processing method according to the present invention includes: estimating a type of a pixel as a target pixel, among a type of a pixel caused by a main lobe, a type of a pixel due to a sidelobe, and a type of any other pixel, at each pixel position of a two-dimensional map of an observed reflected wave intensity; replacing a pixel value of the pixel caused by the main lobe and a pixel value of the pixel due to the sidelobe with pixel values generated in pixel value interpolation processing based on the estimated type of each pixel to generate a first corrected image; applying speckle suppression processing to the first corrected image to generate a second corrected image; and generating an output image, in which speckle and sidelobes are suppressed, by using the two-dimensional map image, the second corrected image, and the type of each pixel.

A radar image processing program according to the present invention causes a computer to execute: a process of estimating a type of a pixel, among a type of a pixel caused by a main lobe, a type of a pixel due to a sidelobe, and a type of any other pixel, at each pixel position of a two-dimensional map of an observed reflected wave intensity; a process of replacing a pixel value of the pixel caused by the main lobe and a pixel value of the pixel due to the sidelobe with pixel values generated in pixel value interpolation processing based on the estimated type of each pixel to generate a first corrected image; a process of applying speckle suppression processing to the first corrected image to generate a second corrected image; and a process of generating an output image, in which speckle and sidelobes are suppressed, by using the two-dimensional map image, the second corrected image, and the type of each pixel.

Advantageous Effects of Invention

According to the present invention, sidelobes and a speckle included in a two-dimensional map image of a reflected wave intensity are suppressed effectively.

DESCRIPTION OF EMBODIMENT

Figure 1:
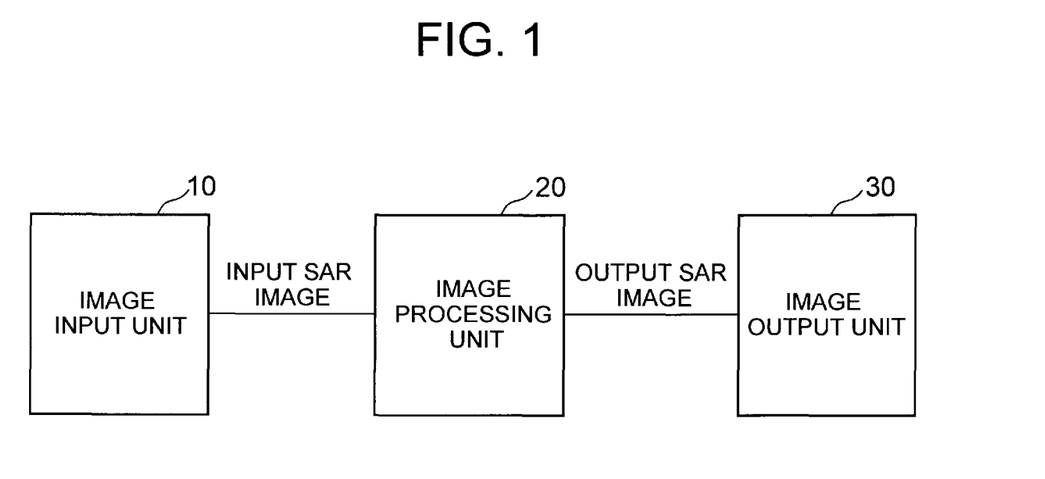
FIG. 1 is a block diagram illustrating a configuration example of an embodiment of a radar image processing device.

An embodiment of the present invention will be described with reference to the accompanying drawings. FIG. 1 is a block diagram illustrating a configuration example of an embodiment of a radar image processing device.

As illustrated in FIG. 1, the radar image processing device includes an image input unit 10, an image processing unit 20, and an image output unit 30.

The image input unit 10 is realized by an image database in which image data are accumulated or a network to which a plurality of image databases is connected. In the embodiment, SAR image data (two-dimensional map image data) are input from the image input unit 10 to the image processing unit 20. An SLC will be taken as an example of SAR image data below. Note that the SAR image data are image data based on the intensity of reflected waves from an observation area observed by the radar after being radiated from the radar to the observation area.

The image processing unit 20 performs cooperative processing for sidelobe suppression and speckle suppression on an input SAR image. Then, the image processing unit 20 outputs, to the image output unit 30, a SAR image with sidelobes and a speckle suppressed.

The image output unit 30 is realized, for example, by a display, a printer, and a storage medium, such as a hard disk or a memory card, on which the image data are held, or a network to which these are connected. The image output unit 30 performs image display, image accumulation, or image transmission.

Figure 2:
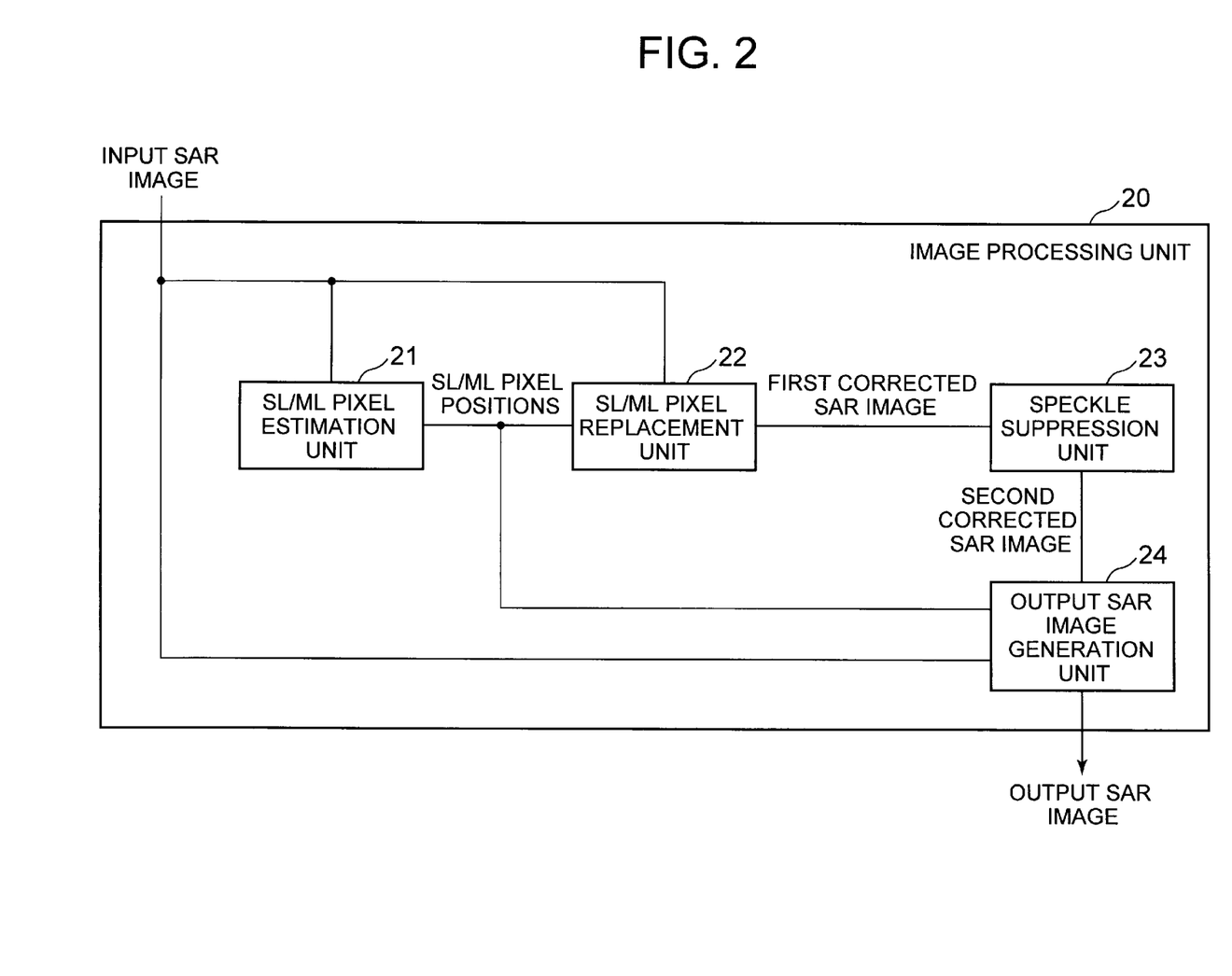
FIG. 2 is a block diagram illustrating a configuration example of an image processing unit.

FIG. 2 is a block diagram illustrating a configuration example of the image processing unit 20. The image processing unit 20 includes an SL (Sidelobe)/ML (Main lobe) pixel estimation unit 21, an SL/ML pixel replacement unit 22, a speckle suppression unit 23, and an output SAR image generation unit 24.

The SL/ML pixel estimation unit 21 estimates whether each pixel of a SAR image input from the image input unit 10 is a pixel caused by the main lobe, a pixel due to the sidelobe, or any other pixel. Then, the SL/ML pixel estimation unit 21 outputs, to the SL/ML pixel replacement unit 22 and the output SAR image generation unit 24, SL/ML pixel position information (specifically, data indicative of the positions of the pixels) as information indicative of the position of the pixel caused by the main lobe and the position of each pixel due to the sidelobe.

The SL/ML pixel replacement unit 22 receives input of the SAR image from the image input unit 10. Further, the SL/ML pixel replacement unit 22 receives input of the SL/ML pixel position information from the SL/ML pixel estimation unit 21. Based on the input SAR image and the input SL/ML pixel position information, the SL/ML pixel replacement unit 22 generates a first corrected SAR image. The SL/ML pixel replacement unit 22 generates the first corrected SAR image in pixel interpolation processing (pixel value interpolation processing).

Specifically, the SL/ML pixel replacement unit 22 performs the pixel interpolation processing using pixels which exist around the pixel caused by the main lobe and each pixel due to the sidelobe but are neither the pixel caused by the main lobe nor the pixel due to the sidelobe. Therefore, no pixel attributed to the main lobe and no pixel attributed to the sidelobes exist in the first corrected SAR image. Then, the SL/ML pixel replacement unit 22 outputs the first corrected SAR image to the speckle suppression unit 23.

The speckle suppression unit 23 applies speckle suppression processing to the first corrected SAR image input from the SL/ML pixel replacement unit 22 to generate a second corrected SAR image with speckle suppressed. Then, the speckle suppression unit 23 outputs the second corrected SAR image to the output SAR image generation unit 24.

Based on the SAR image input from the image input unit 10, the SL/ML pixel position information input from the SL/ML pixel estimation unit 21, and the second corrected SAR image output from the speckle suppression unit 23, the output SAR image generation unit 24 generates an output SAR image by combining main lobe information (information indicative of the pixel value of the main lobe) and the second corrected SAR image. Then, the output SAR image generation unit 24 outputs the output SAR image to the image output unit 30.

Next, the operation of each block in the radar image processing device will be described.

The operation of the SL/ML pixel estimation unit 21 will first be described. First, processing in which the SL/ML pixel estimation unit 21 estimates the position of a pixel caused by the main lobe or a pixel due to the sidelobe from the input SAR image will be described. Here, an example in which SVA described in Non-Patent Literature 1 is used to perform processing is taken.

It is defined that the input SAR image is denoted by I, and a SAR image after SVA is applied is denoted by $I_{SAV}$. The result of SVA processing at the pixel position (x,y) in the image horizontal direction is expressed by Equation (1).

[Math. 1]

$$I_{SVA}(x, y) = \begin{cases} I(x, y) & w(x, y) < 0 \quad \text{main lobe} \\ 0 & 0 \leq w(x, y) \leq \frac{1}{2} \quad \text{sidelobe} \\ I(x, y) + \frac{1}{2}[I(x-1, y) + I(x+1, y)] & w(x, y) > \frac{1}{2} \quad \text{otherwise} \end{cases} \quad (1)$$

where $$w(x, y) = -\frac{I(x, y)}{I(x-1, y) + I(x+1, y)}$$

Since the input SAR image is the SLC, each pixel value is a complex number. Equation (1) is applied independently to the real part and the imaginary part of the complex number, respectively. In Chapter II of Non-Patent Literature 3, there is a description related to Equation (1). For simplicity, Equation (1) will be described by taking the horizontal direction as an example with y fixed. Since reflected waves generated from a ground-surface object at a pixel position $x_0$ is represented by a sinc function after being subjected to the application of pulse compression, a pixel value I(x) of a pixel position x is expressed by Equation (2).

[Math. 2]

$$I(x) = \text{sinc}(x - x_0) = \frac{\sin \pi (x - x_0)}{\pi (x - x_0)} \quad (2)$$

Equation (3) is obtained by substituting I(x) in Equation (2) into w(x,y) in Equation (1).

[Math 3]

$$w(x) = -\frac{\text{sinc}(x - x_0)}{\text{sinc}(x - 1 - x_0) + \text{sinc}(x + 1 - x_0)} = \frac{(x - x_0)^2 - 1}{2(x - x_0)^2} \quad (3)$$

Equation (4) is derived from Equation (3).

[Math 4]

$$\begin{cases} \lim_{x - x_0 \to 0} w(x) = -\infty \\ w(x)|_{x - x_0 \to \pm 1} = 0 \\ \lim_{x - x_0 \to \pm \infty} w(x) = \frac{1}{2} \end{cases} \quad (4)$$

The main lobe is generated ideally by one pixel alone. Therefore, the pixel value of only a pixel estimated to be the pixel caused by the main lobe takes a negative value. The pixel values of the other pixels take values of 0 or more. Further, assuming that the pixel corresponds to a signal only from one point on a ground-surface object and there is no noise, w(x) will not take on a value of 0.5 or more. However, it may actually be w(x)>0.5 due to overlap of signals from two or more ground-surface objects or the presence of noise. In this case, the pixel is estimated to be neither a pixel caused by the main lobe nor a pixel due to the sidelobe.

The SL/ML pixel estimation unit 21 calculates w(x,y) at each pixel position, and based on the value, estimates whether the pixel is a pixel caused by the main lobe, a pixel due to the sidelobe, or any other pixel. In other words, the SL/ML pixel estimation unit 21 executes estimation processing on the pixel type. Then, the SL/ML pixel estimation unit 21 stores, in a storage unit (not illustrated), for example, data expressed in Equation (5) as the estimation result E(x,y) of each pixel. Note that $\gamma_{min}=0$, $\gamma_{max}=\frac{1}{2}$ in principle, but it may be changed to adjust the image quality.

[Math 5]

$$E(x, y) = \begin{cases} 0 & w(x, y) < \gamma_{min} \quad \text{main lobe} \\ 1 & \gamma_{min} \leq w(x, y) \leq \gamma_{max} \quad \text{sidelobe} \\ 2 & w(x, y) > \gamma_{max} \quad \text{otherwise} \end{cases} \quad (5)$$

where $$w(x, y) = -\frac{I(x, y)}{I(x - 1, y) + I(x + 1, y)}$$

The SL/ML pixel estimation unit 21 executes the estimation processing both in the horizontal direction and the vertical direction of the image. The SL/ML pixel estimation unit 21 calculates the estimation result $E_H$ in the horizontal direction and the estimation result $E_V$ in the vertical direction. Then, the SL/ML pixel estimation unit 21 integrates the estimation result in the horizontal direction and the estimation result in the vertical direction to generate the estimation result E (x,y) of each target pixel (x,y) according to conditions at 1. to 3. below.

Note that the SL/ML pixel estimation unit 21 uses a relationship between the pixel value of a pixel (neighbor pixel), located in the neighborhood of the target pixel in the horizontal direction or the vertical direction, and the pixel value of the target pixel to estimate the type of the target pixel (a pixel caused by the main lobe, a pixel due to the sidelobe, or any other pixel). Here, a pixel (pixel at ±1 position) adjacent to the target pixel is used as the neighbor pixel, but the range of neighbor pixels may be extended. Further, a pixel at a decimal pixel position may be generated and processed in addition to the pixel at an integer pixel position.

1. E(x,y)=0 when either or both of $E_H(x,y)$ and $E_V(x,y)$ are based on the main lobe. In other words, the SL/ML pixel estimation unit 21 treats the target pixel (x,y) as the pixel caused by the main lobe. In other words, when at least either of the type of the pixel estimated in the horizontal direction of the image and the type of the pixel estimated in the vertical direction is the pixel caused by the main lobe, the SL/ML pixel estimation unit 21 regards the target pixel as the pixel caused by the main lobe.

2. E(x,y)=1 when either one of $E_H(x,y)$ and $E_V(x,y)$ is based on a sidelobe and the other is not based on the main lobe. In other words, the SL/ML pixel estimation unit 21 treats the target pixel (x,y) as a pixel due to the sidelobe. Namely, when both of the types of pixels estimated in both directions (vertical direction and horizontal direction) are not of pixels caused by the main lobe and at least either one is a pixel due to the sidelobe, the SL/ML pixel estimation unit 21 regards the target pixel as a pixel due to the sidelobe.

3. E(x,y)=2 when it corresponds to neither of the conditions 1. and 2. In other words, the SL/ML pixel estimation unit 21 treats the target pixel (x,y) as any other pixel (neither the pixel caused by the main lobe not the pixel due to the sidelobe).

The summary of the above conditions 1. to 3. is as in Table 1.

TABLE 1

|  |  | Estimation Result in Horizontal Direction | | |
|---|---|---|---|---|
|  |  | ML | SL | Other |
| Estimation Result in Vertical Direction | ML | ML | ML | ML |
|  | SL | ML | SL | SL |
|  | Other | ML | SL | Other |

Since each pixel value of the input SAR image is a complex number, the SL/ML pixel estimation unit 21 applies the above processing to the real part and the imaginary part independently of each other. In other words, the estimation results E(x,y) E are calculated for the real part and the imaginary part independently of each other. The estimation results calculated independently may be integrated and used as illustrated in Table 2.

TABLE 2

|  |  | Estimation Result of Real Part | | |
|---|---|---|---|---|
|  |  | ML | SL | Other |
| Estimation Result of Imaginary Part | ML | ML | ML | ML |
|  | SL | ML | SL | SL |
|  | Other | ML | SL | Other |

The SL/ML pixel estimation unit 21 outputs, to the SL/ML pixel replacement unit 22 and the output SAR image generation unit 24, the estimation result E(x,y) calculated as described above.

Next, the operation of the SL/ML pixel replacement unit 22 will be described. The SL/ML pixel replacement unit 22 replaces the pixel value of each of the pixel caused by the main lobe and the pixel due to the sidelobe of the input SAR image with a pixel value generated by interpolation processing, for example, in a manner to be described below to generate a first corrected SAR image.

The input SAR image is denoted by I, and the first corrected SAR image is denoted by $I_1$. When the target pixel (x,y) is the pixel caused by the main lobe or the pixel due to the sidelobe, i.e., in the case of E(x,y)<2, $I_1$(x,y) is calculated as in Equation (6).

[Math 6]

$$I_1(x, y) = \frac{1}{\sum_{i=-t_1}^{t_1} \sum_{j=-t_2}^{t_2} h(x+i, y+j)} \sum_{i=-t_1}^{t_1} \sum_{j=-t_2}^{t_2} h(x+i, y+j) \times I(x+i, y+j) \quad (6)$$

where $$h(x+i, y+j) = \begin{cases} 0 & E(x, y) < 2 \\ 1 & \text{otherwise} \end{cases}$$

$t_1$, $t_2$ represent filter kernel lengths. As illustrated in Equation (6), the pixel values of the pixel caused by the main lobe and the pixel due to the sidelobe are replaced with pixel values generated by interpolation using any other pixels (neither the pixel caused by the main lobe nor the pixel due to the sidelobe).

In Equation (6), $t_1$, $t_2$ are small numbers such as 1. In other words, the corrected pixel value of the pixel caused by the main lobe and the corrected pixel value of the pixel due to the sidelobe are determined by the interpolation processing using neighbor pixels as pixels each of which is neither the pixel caused by the main lobe nor the pixel due to the sidelobe (i.e., a neighbor pixel of the pixel caused by the main lobe or the pixel due to the sidelobe).

Further, the calculation formula for interpolation is not limited to Equation (6). For example, like in Equation (7), a weight d(i,j) may be given to a filter coefficient based on the distance from the target pixel.

[Math 7]

$$I_1(x, y) = \frac{1}{\sum_{i=-t_1}^{t_1} \sum_{j=-t_2}^{t_2} d(i, j) \times h(x+i, y+j)} \sum_{i=-t_1}^{t_1} \sum_{j=-t_2}^{t_2} d(i, j) \times h(x+i, y+j) \times I(x+i, y+j) \quad (7)$$

where $$d(i, j) = \exp\left(-\frac{i^2 + j^2}{2\sigma^2}\right)$$

Since each pixel value of the input SAR image is a complex number, the SL/ML pixel replacement unit 22 applies the above processing to the real part and the imaginary part independently of each other. In other words, when the real part and the imaginary part are independent of each other in terms of the estimation result E(x,y) of each pixel, the SL/ML pixel replacement unit 22 performs the interpolation processing in the real part using the estimation result related to the real part, and performs the interpolation processing in the imaginary part using the estimation result related to the imaginary part. Note that, when the estimation result E(x,y) of each pixel is as a result of integrating the estimation result of the real part and the estimation result of the imaginary part, the SL/ML pixel replacement unit 22 performs the interpolation processing for the real part and the imaginary part using the estimation result common between the real part and the imaginary part.

The SL/ML pixel replacement unit 22 outputs, to the speckle suppression unit 23, the first corrected SAR image $I_1$ calculated as described above.

Next, the operation of the speckle suppression unit 23 will be described. The speckle suppression unit 23 applies a speckle suppression technique to the first corrected SAR image $I_1$ to generate a second corrected SAR image $I_2$.

In the first corrected SAR image $I_1$, no pixel caused by the main lobe 1 having a low correlation with surrounding pixels and no pixel due to the sidelobe exist. Therefore, the speckle suppression unit 23 can suppress speckle effectively.

As the noise suppression technique using the correlation or redundancy between pixels, for example, the speckle suppression unit 23 uses a technique called Redundant DCT (R-DCT) using discrete cosine transform (DCT) for redundancy.

Using R-DCT, the speckle suppression unit 23 applies DCT to a block of n×n pixels in which the target pixel (x,y) is arranged on the top left to obtain an n×n coefficient block F. Then, the speckle suppression unit 23 uses a threshold parameter τ to apply threshold processing by Equation (8) to a DCT coefficient value of a coefficient position (i,j) in the coefficient block F.

[Math 8]

$$F'(i, j) = \begin{cases} F(i, j) & |F(i, j)| > \tau \text{ or } (i, j) = (0, 0) \\ 0 & \text{otherwise} \end{cases} \quad (8)$$

Note that (i,j)=(0,0) is not processed because of a DC component.

The speckle suppression unit 23 applies inverse DCT to a coefficient block F' after being subjected to the above threshold processing to obtain a pixel block in which noise is suppressed. The speckle suppression unit 23 applies the threshold processing and inverse DCT while shifting the block one pixel by one pixel so that respective blocks will overlap with one another redundantly. Then, the speckle suppression unit 23 integrates blocks obtained in respective block patterns after being subjected to noise suppression to obtain a final image after being subjected to noise suppression. Note that the integration of blocks means average processing for each pixel position.

In the embodiment, R-DCT is used as the speckle suppression technique, but the speckle suppression technique is not limited to R-DCT. As an example, the technique described in Non-Patent Literature 2 may be used.

Figure 3:
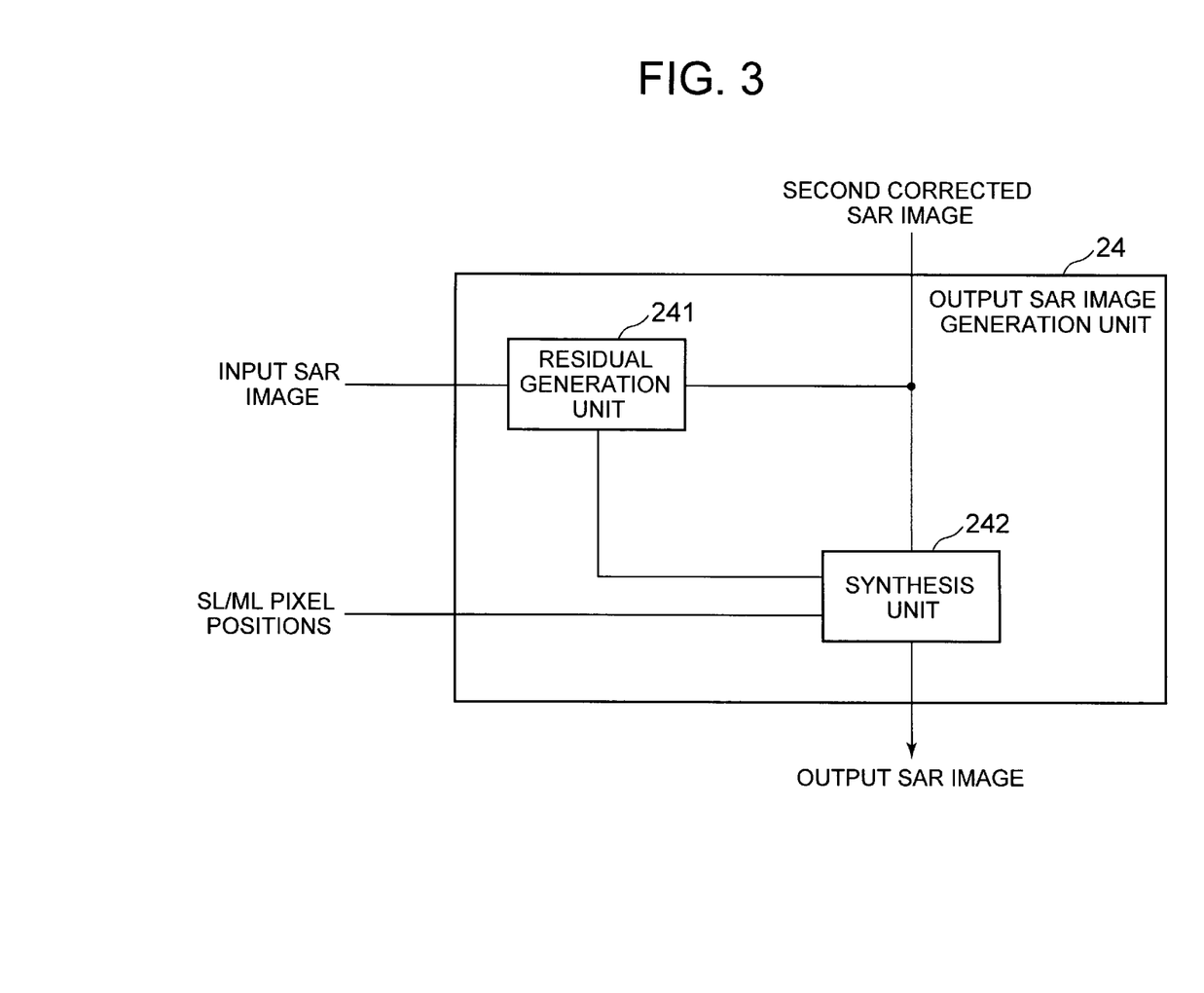
FIG. 3 is a block diagram illustrating a configuration example of an output SAR image generation unit.

Next, the configuration and operation of the output SAR image generation unit 24 will be described.

FIG. 3 is a block diagram illustrating a configuration example of the output SAR image generation unit 24. In the example illustrated in FIG. 3, the output SAR image generation unit 24 includes a residual generation unit 241 and a synthesis unit 242.

The residual generation unit 241 receives the input SAR image input from the image input unit 10 and the second corrected SAR image input from the speckle suppression unit 23. The residual generation unit 241 generates a residual image between the input SAR image and the second corrected SAR image. Then, the residual generation unit 241 outputs the generated residual image to the synthesis unit 242.

Based on the SL/ML pixel position information (indicative of the position of the pixel caused by the main lobe and the position of each pixel due to the sidelobe) input from the SL/ML pixel estimation unit 21, the second corrected SAR image $I_2$ input from the speckle suppression unit 23, and the residual image input from the residual generation unit 241, the synthesis unit 242 generates an output SAR image. Then, the synthesis unit 242 outputs the output SAR image to the image output unit 30.

Next, the operation of the output SAR image generation unit 24 will be described.

The residual generation unit 241 creates a residual image R from the input SAR image I and the second corrected SAR image $I_2$ as described below.

$$R(x,y) = I(x,y) - I_2(x,y)$$

Using the second corrected SAR image $I_2$, the residual image R, and the pixel estimation result E, the synthesis unit 242 generates the output SAR image O(x,y). Specifically, the synthesis unit 242 combines a value of pixel caused by the main lobe and the residual image R on the second corrected SAR image $I_2$ as illustrated in Equation (9) to generate the output SAR image O(x,y).

[Math 9]

$$O(x, y) = I_2(x, y) + s(x, y) \times R(x, y) \text{ where} \quad (9)$$
$$s(x, y) = \begin{cases} 1 & E(x, y) = 0 \\ 0 & \text{otherwise} \end{cases}$$

When the pixel at the pixel position (x,y) is the pixel caused by the main lobe, that is, when s(x,y)=1, use of Equation (9) results in as follows:

$$O(x, y) = I_2(x, y) + R(x, y)$$
$$= I_2(x, y) + I(x, y) - I_2(x, y)$$
$$= I(x, y).$$

Therefore, the main lobe information is maintained.

When the pixel at the pixel position (x,y) is neither the pixel caused by the main lobe nor the pixel due to the sidelobe, processing for combining part of a residual component and the output SAR image may be added to reduce damage to an original signal due to speckle oversuppression.

As an example, the synthesis unit 242 may combine a certain percentage of the residual image R like r×R(x,y) as a correction value and the output SAR image.

Further, in consideration of the fact that speckle is signal-dependent noise, the synthesis unit 242 may take, as input, $I_2(x,y)$ as an estimate of the signal value at the target pixel to estimate the amount of noise injection at the target pixel by a noise function σ (.) functionalized by prior noise analysis so as to combine a residual component with noise subtracted as a correction value and the output SAR image. In this case, the synthesis unit 242 may perform logarithmic transformation of speckle as multiplicative noise into additive noise and perform difference processing thereon, and then apply processing for returning to an original scale by indexing.

Figure 4:
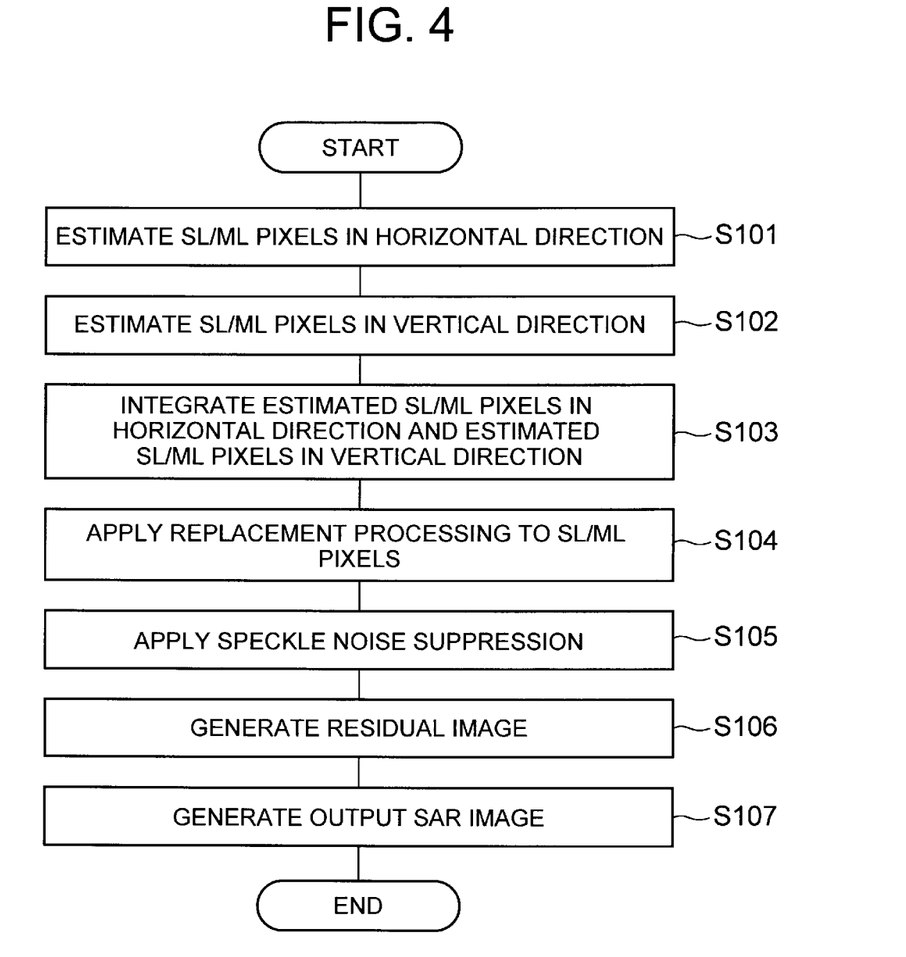
FIG. 4 is a flowchart illustrating a flow of image processing of the embodiment.

Next, a flow of image processing of the embodiment will be described with reference to a flowchart in FIG. 4.

For example, a user selects a SAR image as a processing target in the image input unit 10 to decide on input to the image processing unit 20.

The SL/ML pixel estimation unit 21 estimates the type of each pixel of the input SAR image in the horizontal direction of the image (step S101). Further, the SL/ML pixel estimation unit 21 estimates the type of each pixel in the vertical direction of the image (step S102). Then, the SL/ML pixel estimation unit 21 integrates the estimation results in the horizontal and vertical directions (step S103). Since each pixel value of the input SAR image is a complex number, each processing is executed on the real part and the imaginary part independently of each other.

Using information on the estimated SL/ML pixels, the SL/ML pixel replacement unit 22 applies interpolation processing to the pixel value of the main lobe and the pixel value of each sidelobe of the input SAR image to perform replacement of the pixel values to generate a first corrected SAR image in which neither a main lobe component nor a sidelobe component exists (step S104).

The speckle suppression unit 23 applies the speckle suppression technique to the first corrected SAR image to generate a second corrected SAR image (step S105).

Next, the residual generation unit 241 generates a difference image (residual image) between the input SAR image and the second corrected SAR image (step S106).

Then, the output SAR image generation unit 24 combines values of the residual image in a manner and the second corrected SAR image to maintain the pixel value of the main lobe in order to generate an output SAR image (step S107).

Figure 5:
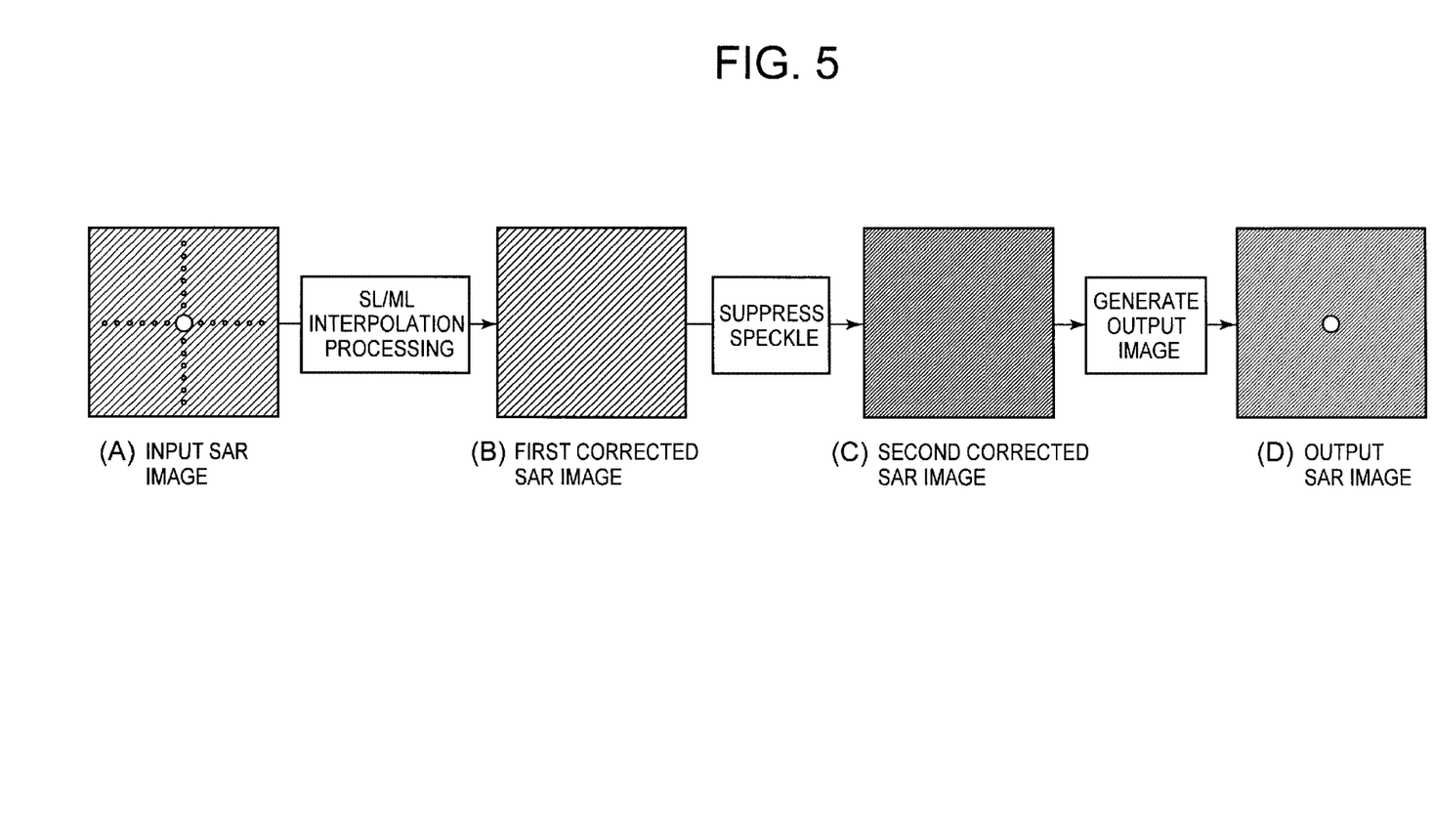
FIG. 5 is an explanatory diagram for describing the effect of the embodiment.

FIG. 5 is an explanatory diagram for describing the effect of the embodiment.

It is estimated by the SL/ML pixel estimation unit 21 as to whether each pixel of an input SAR image illustrated at (A) is a pixel caused by the main lobe, a pixel due to the sidelobe, or any other pixel. Then, an image in which neither a main lobe component nor a sidelobe component exists is generated by the SL/ML pixel replacement unit 22 as a first corrected image (see FIG. 5(B)).

Further, the speckle suppression processing is applied by the speckle suppression unit 23 to the first corrected image, and a second corrected image is generated (see FIG. 5(C)). Then, the second corrected image is corrected by the output SAR image generation unit 24 to maintain the pixel value of the main lobe, and an output SAR image is generated (see FIG. 5(D)).

Figure 6:
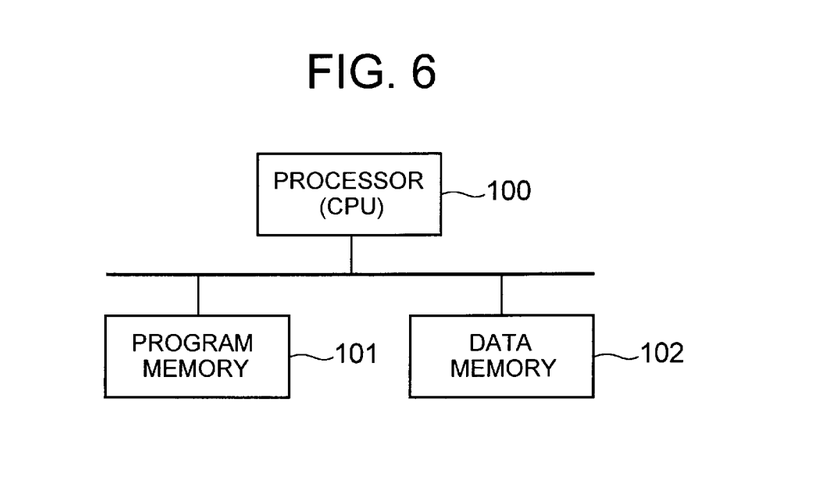
FIG. 6 is a block diagram illustrating an example of an information processing system using a program.

Although each block in the embodiment can be configured by hardware, it can also be implemented by a computer program. For example, as illustrated in FIG. 6, the function or part of the function of each block (each of the SL/ML pixel estimation unit 21, the SL/ML pixel replacement unit 22, the speckle suppression unit 23, and the output SAR image generation unit 24) in the above-described embodiment can be implemented by a processor 100 such as a CPU (Central Processing Unit) operating according to a program stored in a program memory 101 (for example, a ROM (Read Only Memory) or a flash ROM).

Note that a data memory 102 can be realized by a semiconductor memory, a magnetic recording medium, or the like, and SAR image data are stored in the data memory 102, for example.

Further, in the aforementioned embodiment, the synthetic aperture radar assumed to be mounted on an aircraft, an artificial satellite, or the like is exemplified as a radar device, but the present invention is also applicable to a radar device as any radar device other than such a synthetic aperture radar, which uses pulse compression technology and synthetic aperture technology.

Figure 7:
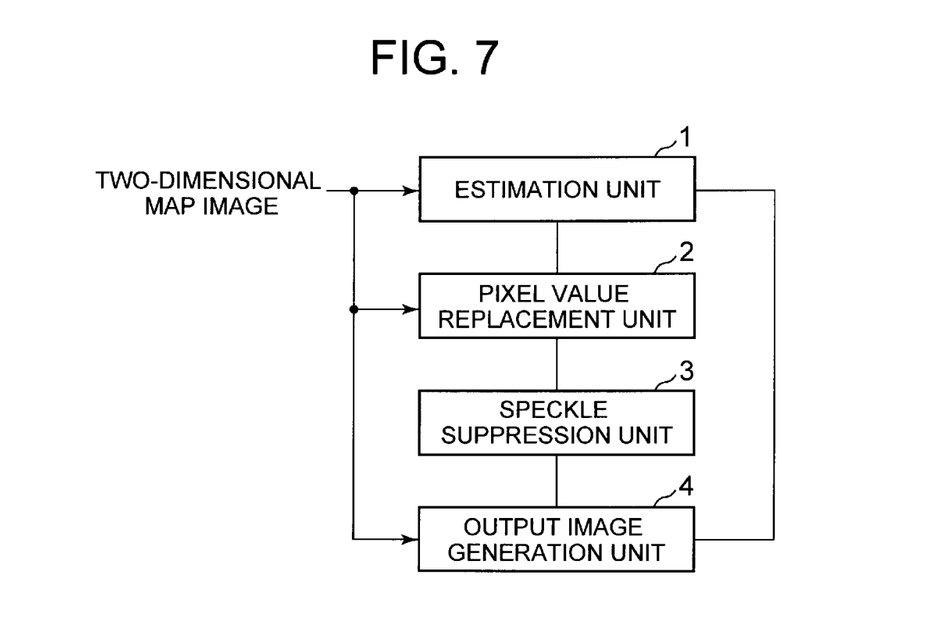
FIG. 7 is a block diagram illustrating a main part of the radar image processing device.

FIG. 7 is a block diagram illustrating a main part of the radar image processing device. As illustrated in FIG. 7, the radar image processing device includes: an estimation unit 1 (realized by the SL/ML pixel estimation unit 21 in the embodiment) for estimating a type of a pixel, among a type of a pixel caused by a main lobe, a type of a pixel due to a sidelobe, and a type of any other pixel, at each pixel position of a two-dimensional map of an observed reflected wave intensity; a pixel value replacement unit 2 (realized by the SL/ML pixel replacement unit 22 in the embodiment) for replacing the pixel value of the pixel caused by the main lobe and the pixel value of each pixel due to the sidelobe with pixel values generated by pixel value interpolation processing based on the type of each pixel estimated by the estimation unit 1 to generate a first corrected image (the first corrected SAR image in the embodiment); a speckle suppression unit 3 (realized by the speckle suppression unit 23 in the embodiment) for applying speckle suppression processing to the first corrected image to generate a second corrected image (the second corrected SAR image in the embodiment); and an output image generation unit 4 (realized by the output SAR image generation unit 24 in the embodiment) for generating an output image (the output SAR image in the embodiment), in which speckle and sidelobes are suppressed, by using the two-dimensional map image, the second corrected image, and the type of each pixel.

The estimation unit 1 stores, in a storage unit, data indicative, for example, of the estimated type of each pixel. The pixel value replacement unit 2 reads the data from the storage unit to identify the type of each pixel. The pixel value replacement unit 2 stores, in the storage unit, data indicative, for example, the generated first corrected image. The speckle suppression unit 3 reads the data from the storage unit to obtain the first corrected image. The speckle suppression unit 3 stores, in the storage unit, data indicative, for example, the generated second corrected image. The output image generation unit 4 reads the data from the storage unit to obtain the first corrected image and the second corrected image.

Part or whole of the aforementioned embodiment can also be stated as in the following Supplementary Notes, but the present invention is not limited to the following.

(Supplementary Note 1)

A radar image processing device including:

estimation means for estimating a type of a pixel as a target pixel, among a type of a pixel caused by a main lobe, a type of a pixel due to a sidelobe, and a type of any other pixel, at each pixel position of a two-dimensional map of an observed reflected wave intensity;

pixel value replacement means for replacing a pixel value of the pixel caused by the main lobe and a pixel value of the pixel due to the sidelobe with pixel values generated in pixel value interpolation processing based on the type of each pixel estimated by the estimation means to generate a first corrected image;

speckle suppression means for applying speckle suppression processing to the first corrected image to generate a second corrected image; and output image generation means for generating an output image, in which speckle and sidelobes are suppressed, by using the two-dimensional map image, the second corrected image, and the type of each pixel.

(Supplementary Note 2)

The radar image processing device of Supplementary Note 1, wherein the estimation means estimates types of each pixel in a horizontal direction and a vertical direction of the image, respectively.

(Supplementary Note 3)

The radar image processing device of Supplementary Note 2, wherein the estimation means integrates the type of the pixel estimated in the horizontal direction of the image and the type of the pixel estimated in the vertical direction of the image.

(Supplementary Note 4)

The radar image processing device of Supplementary Note 3, wherein when at least either of the type of the pixel estimated in the horizontal direction of the image and the type of the pixel estimated in the vertical direction of the image is the pixel caused by the main lobe, the estimation means regards the target pixel as the pixel caused by the main lobe, while when the types of the pixel estimated in both directions are not the pixel caused by the main lobe and at least either thereof is the pixel due to the sidelobe, the estimation means regards the target pixel as the pixel due to the sidelobe.

(Supplementary Note 5)

The radar image processing device of any one of Supplementary Note 1 to Supplementary Note 4, wherein the estimation means estimates the type of the pixel based on a relationship between a pixel value of a pixel, located in the neighborhood of the target pixel in the horizontal direction or the vertical direction, and the pixel value of the target pixel.

(Supplementary Note 6)

The radar image processing device of any one of Supplementary Note 1 to Supplementary Note 5, wherein the pixel value replacement means executes the pixel value interpolation processing related to the pixel value of the target pixel by using a pixel located in the neighborhood of the target pixel, which is neither the pixel caused by the main lobe nor the pixel due to the sidelobe.

(Supplementary Note 7)

The radar image processing device of any one of Supplementary Note 1 to Supplementary Note 6, wherein upon generating the output image, the output image generation means corrects a residual image between the two-dimensional map image and the second corrected image based on the type of each pixel, and combines the corrected residual image and the second corrected image.

(Supplementary Note 8)

A radar image processing method including:

estimating a type of a pixel as a target pixel, among a type of a pixel caused by a main lobe, a type of a pixel due to a sidelobe, and a type of any other pixel, at each pixel position of a two-dimensional map of an observed reflected wave intensity;

replacing a pixel value of the pixel caused by the main lobe and a pixel value of the pixel due to the sidelobe with pixel values generated in pixel value interpolation processing based on the estimated type of each pixel to generate a first corrected image;

applying speckle suppression processing to the first corrected image to generate a second corrected image; and generating an output image, in which speckle and sidelobes are suppressed, by using the two-dimensional map image, the second corrected image, and the type of each pixel.

(Supplementary Note 9)

The radar image processing method of Supplementary Note 8, wherein types of each pixel are estimated in a horizontal direction and a vertical direction of the image, respectively.

(Supplementary Note 10)

The radar image processing method of Supplementary Note 9, wherein the type of the pixel estimated in the horizontal direction of the image and the type of the pixel estimated in the vertical direction of the image are integrated.

(Supplementary Note 11)

The radar image processing method of Supplementary Note 10, wherein when at least either of the type of the pixel estimated in the horizontal direction of the image and the type of the pixel estimated in the vertical direction of the image is the pixel caused by the main lobe, the target pixel is regarded as the pixel caused by the main lobe, while when the types of the pixel estimated in both directions are not the pixel caused by the main lobe and at least either thereof is the pixel due to the sidelobe, the target pixel is regarded as the pixel due to the sidelobe.

(Supplementary Note 12)

The radar image processing method of any one of Supplementary Note 8 to Supplementary Note 11, wherein the type of the pixel is estimated based on a relationship between a pixel value of a pixel, located in the neighborhood of the target pixel in the horizontal direction or the vertical direction, and the pixel value of the target pixel.

(Supplementary Note 13)

The radar image processing method of any one of Supplementary Note 8 to Supplementary Note 12, wherein the pixel value interpolation processing related to the pixel value of the target pixel is executed by using a pixel located in the neighborhood of the target pixel, which is neither the pixel caused by the main lobe nor the pixel due to the sidelobe.

(Supplementary Note 14)

The radar image processing method of any one of Supplementary Note 8 to Supplementary Note 13, wherein upon generating the output image, a residual image between the two-dimensional map image and the second corrected image is corrected based on the type of each pixel, and combines the corrected residual image and the second corrected image.

(Supplementary Note 15)

A radar image processing program causing a computer to execute:

a process of estimating a type of a pixel, among a type of a pixel caused by a main lobe, a type of a pixel due to a sidelobe, and a type of any other pixel, at each pixel position of a two-dimensional map of an observed reflected wave intensity;

a process of replacing a pixel value of the pixel caused by the main lobe and a pixel value of the pixel due to the sidelobe with pixel values generated in pixel value interpolation processing based on the estimated type of each pixel to generate a first corrected image;

a process of applying speckle suppression processing to the first corrected image to generate a second corrected image; and a process of generating an output image, in which speckle and sidelobes are suppressed, by using the two-dimensional map image, the second corrected image, and the type of each pixel.

(Supplementary Note 16)

The radar image processing program for implementing the radar image processing method of any one of Supplementary Note 8 to Supplementary Note 14.

This application claims the benefit of priority to Japanese Patent Application No. 2017-192496, filed on Oct. 2, 2017, the entire contents of which are incorporated herein by reference.

While the present invention has been described above with reference to the embodiment, the present invention is not limited to the aforementioned embodiment. Various changes understandable by those skilled in the art within the scope of the present invention can be made for the arrangements and details of the present invention.

REFERENCE SIGNS LIST 1 estimation unit
2 pixel value replacement unit
3 speckle suppression unit
4 output image generation unit
10 image input unit
20 image processing unit
21 SL/ML pixel estimation unit
22 SL/ML pixel replacement unit
23 speckle suppression unit
24 output SAR image generation unit
30 image output unit
100 processor
101 program memory
102 data memory
241 residual generation unit
242 synthesis unit

The invention claimed is:

1. A radar image processing device comprising:
at least one processor; and
at least one memory storing executable instructions that, when executed by the processor, causes the processor to perform as:
an estimation unit which estimates a type of a pixel as a target pixel, among a type of a pixel caused by a main lobe, a type of a pixel due to a sidelobe, and a type of any other pixel, at each pixel position of a two-dimensional map image of an observed reflected wave intensity;
a pixel value replacement unit which replaces a pixel value of the pixel caused by the main lobe and a pixel value of the pixel due to the sidelobe with pixel values generated in pixel value interpolation processing based on the type of each pixel estimated by the estimation unit to generate a first corrected image;
a speckle suppression unit which applies speckle suppression processing to the first corrected image to generate a second corrected image; and
an output image generation unit which generates an output image, in which speckle and sidelobes are suppressed, by using the two-dimensional map image, the second corrected image, and the type of each pixel.

2. The radar image processing device according to claim 1, wherein the estimation unit estimates types of each pixel in a horizontal direction and a vertical direction of the image, respectively.

3. The radar image processing device according to claim 2, wherein the estimation unit integrates the type of the pixel estimated in the horizontal direction of the image and the type of the pixel estimated in the vertical direction of the image.

4. The radar image processing device according to claim 3, wherein when at least either of the type of the pixel estimated in the horizontal direction of the image and the type of the pixel estimated in the vertical direction of the image is the pixel caused by the main lobe, the estimation unit regards the target pixel as the pixel caused by the main lobe, while when the types of the pixel estimated in both directions are not the pixel caused by the main lobe and at least either thereof is the pixel due to the sidelobe, the estimation unit regards the target pixel as the pixel due to the sidelobe.

5. The radar image processing device according to claim 1, wherein the estimation unit estimates the type of the pixel based on a relationship between a pixel value of a pixel, located in a neighborhood of the target pixel in the horizontal direction or the vertical direction, and the pixel value of the target pixel.

6. The radar image processing device according to claim 1, wherein the pixel value replacement unit executes the pixel value interpolation processing related to the pixel value of the target pixel by using a pixel located in a neighborhood of the target pixel, which is neither the pixel caused by the main lobe nor the pixel due to the sidelobe.

7. The radar image processing device according to claim 1, wherein upon generating the output image, the output image generation unit corrects a residual image between the two-dimensional map image and the second corrected image based on the type of each pixel, and combines the corrected residual image and the second corrected image.

8. A radar image processing method comprising:
   estimating a type of a pixel as a target pixel, among a type of a pixel caused by a main lobe, a type of a pixel due to a sidelobe, and a type of any other pixel, at each pixel position of a two-dimensional map image of an observed reflected wave intensity;
   replacing a pixel value of the pixel caused by the main lobe and a pixel value of the pixel due to the sidelobe with pixel values generated in pixel value interpolation processing based on the estimated type of each pixel to generate a first corrected image;
   applying speckle suppression processing to the first corrected image to generate a second corrected image; and
   generating an output image, in which speckle and sidelobes are suppressed, by using the two-dimensional map image, the second corrected image, and the type of each pixel.

9. The radar image processing method according to claim 8, wherein the type of each pixel is estimated based on a relationship between a pixel value of a pixel, located in a neighborhood of the target pixel in a horizontal direction or a vertical direction, and the target pixel.

10. A non-transitory computer readable information recording medium storing a radar image processing program, when executed by a processor, perform:
   estimating a type of a pixel, among a type of a pixel caused by a main lobe, a type of a pixel due to a sidelobe, and a type of any other pixel, at each pixel position of a two-dimensional map image of an observed reflected wave intensity;
   replacing a pixel value of the pixel caused by the main lobe and a pixel value of the pixel due to the sidelobe with pixel values generated in pixel value interpolation processing based on the estimated type of each pixel to generate a first corrected image;
   applying speckle suppression processing to the first corrected image to generate a second corrected image; and
   generating an output image, in which speckle and sidelobes are suppressed, by using the two-dimensional map image, the second corrected image, and the type of each pixel.

11. The radar image processing device according to claim 2, wherein the estimation unit estimates the type of the pixel based on a relationship between a pixel value of a pixel, located in a neighborhood of the target pixel in the horizontal direction or the vertical direction, and the pixel value of the target pixel.

12. The radar image processing device according to claim 3, wherein the estimation unit estimates the type of the pixel based on a relationship between a pixel value of a pixel, located in a neighborhood of the target pixel in the horizontal direction or the vertical direction, and the pixel value of the target pixel.

13. The radar image processing device according to claim 4, wherein the estimation unit estimates the type of the pixel based on a relationship between a pixel value of a pixel, located in a neighborhood of the target pixel in the horizontal direction or the vertical direction, and the pixel value of the target pixel.

14. The radar image processing device according to claim 2, wherein the pixel value replacement unit executes the pixel value interpolation processing related to the pixel value of the target pixel by using a pixel located in a neighborhood of the target pixel, which is neither the pixel caused by the main lobe nor the pixel due to the sidelobe.

15. The radar image processing device according to claim 3, wherein the pixel value replacement unit executes the pixel value interpolation processing related to the pixel value of the target pixel by using a pixel located in a neighborhood of the target pixel, which is neither the pixel caused by the main lobe nor the pixel due to the sidelobe.

16. The radar image processing device according to claim 4, wherein the pixel value replacement unit executes the pixel value interpolation processing related to the pixel value of the target pixel by using a pixel located in a neighborhood of the target pixel, which is neither the pixel caused by the main lobe nor the pixel due to the sidelobe.

17. The radar image processing device according to claim 5, wherein the pixel value replacement unit executes the pixel value interpolation processing related to the pixel value of the target pixel by using a pixel located in the neighborhood of the target pixel, which is neither the pixel caused by the main lobe nor the pixel due to the sidelobe.

18. The radar image processing device according to claim 2, wherein upon generating the output image, the output image generation unit corrects a residual image between the two-dimensional map image and the second corrected image based on the type of each pixel, and combines the corrected residual image and the second corrected image.

19. The radar image processing device according to claim 3, wherein upon generating the output image, the output image generation unit corrects a residual image between the two-dimensional map image and the second corrected image based on the type of each pixel, and combines the corrected residual image and the second corrected image.

20. The radar image processing device according to claim 4, wherein upon generating the output image, the output image generation unit corrects a residual image between the two-dimensional map image and the second corrected image based on the type of each pixel, and combines the corrected residual image and the second corrected image.

* * * * *